United States Patent
Burnham et al.

(10) Patent No.: US 12,035,079 B2
(45) Date of Patent: Jul. 9, 2024

(54) COLOUR OPTIMISATION FOR DIRECT VIEW

(71) Applicant: Envisics Ltd, Milton Keynes (GB)

(72) Inventors: Daniel Burnham, Milton Keynes (GB); Timothy Smeeton, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 17/938,169

(22) Filed: Oct. 5, 2022

(65) Prior Publication Data
US 2023/0188688 A1    Jun. 15, 2023

(30) Foreign Application Priority Data
Dec. 10, 2021    (GB) .................................... 2117867

(51) Int. Cl.
| | |
|---|---|
| *G06T 7/90* | (2017.01) |
| *G03H 1/22* | (2006.01) |
| *H04N 9/31* | (2006.01) |
| *G02F 1/1362* | (2006.01) |

(52) U.S. Cl.
CPC ......... *H04N 9/3182* (2013.01); *G03H 1/2202* (2013.01); *G03H 1/2286* (2013.01);
(Continued)

(58) Field of Classification Search
CPC .. H04N 9/3182; H04N 9/3138; H04N 9/3141; G06T 7/90; G06T 2207/10024;
(Continued)

(56) References Cited

U.S. PATENT DOCUMENTS

| | | | |
|---|---|---|---|
| 5,475,512 A | 12/1995 | Nakazawa | |
| 5,644,414 A * | 7/1997 | Kato | ........................ G03H 1/08 |
| | | | 359/24 |

(Continued)

FOREIGN PATENT DOCUMENTS

| | | |
|---|---|---|
| CN | 104166336 A | 11/2014 |
| CN | 112558452 A | 3/2021 |

(Continued)

OTHER PUBLICATIONS

Combined Search and Examination Report mailed on May 26, 2022 in UK Patent Application GB 2117867.8 (5 pages).

(Continued)

*Primary Examiner* — Jae N Noh
(74) *Attorney, Agent, or Firm* — Akerman LLP

(57) ABSTRACT

A projection system arranged to receive an image for projection. The image is a colour image comprising a first colour component and a second colour component. The system is arranged to calculate a first hologram of the first colour component and a second hologram of the second colour component. The system is further arranged to add content of the second colour component to the first colour component before calculating the first hologram. The first hologram contains information of the first colour component and information of at least a portion of the second colour component. The system is further arranged to form a first holographic reconstruction by illuminating the first hologram with first colour light and to form a second holographic reconstruction by illuminating the second hologram with second colour light. The first holographic reconstruction changes the chromaticity of the at least a portion of the second colour component.

20 Claims, 11 Drawing Sheets

(52) U.S. Cl.
CPC ............ *G03H 1/2294* (2013.01); *G06T 7/90* (2017.01); *H04N 9/3138* (2013.01); *H04N 9/3141* (2013.01); *G02F 1/136277* (2013.01); *G02F 2203/02* (2013.01); *G02F 2203/12* (2013.01); *G03H 2001/2231* (2013.01); *G06T 2207/10024* (2013.01)

(58) Field of Classification Search
CPC .. G03H 1/2202; G03H 1/2286; G03H 1/2294; G03H 2001/2231; G02F 1/136277; G02F 2203/02; G02F 2203/12
See application file for complete search history.

(56) References Cited

U.S. PATENT DOCUMENTS

| | | | | |
|---|---|---|---|---|
| 2008/0247022 | A1* | 10/2008 | Yamauchi | G02B 27/48 359/211.1 |
| 2020/0271970 | A1 | 8/2020 | Wang et al. | |
| 2021/0097943 | A1 | 4/2021 | Wyatt | |

FOREIGN PATENT DOCUMENTS

| | | |
|---|---|---|
| CN | 112997107 A | 6/2021 |
| GB | 2552851 A | 2/2018 |
| KR | 20160094928 A | 8/2016 |
| KR | 20200116715 A | 10/2020 |
| KR | 20210100414 A | 8/2021 |

OTHER PUBLICATIONS

Notification of Grant for UK App. GB2609679, mailed Jul. 4, 2023 (2 pages).
Extended European Search Report issued in EP 22211298.9 on Apr. 26, 2023 (9 pages).
Shi, Yile et al., "Practical Color Matching Approach for Color Computer-Generated Holography," Journal of Display Technology, vol. 9, No. 8, published Aug. 8, 2013 (6 pages).
Office Action issued on Jan. 22, 2024 in Korean Application KR 10-2022-0124327 (5 pages).
English translation of Office Action issued on Jan. 22, 2024 in Korean Application KR 10-2022-0124327 (5 pages).
Office Action issued on Jan. 8, 2024 in Chinese Application CN112558452A (11 pages).
English translation of Office Action issued on Jan. 8, 2024 in Chinese Application CN112558452A (11 pages).
Buckley, Edward, "Eye-safety analysis of current laser-based scanned-beam projection systems," Journal of the Society of Information Display, vol. 18, Iss. 11, pp. 944-951 (Nov. 2010) (8 pages).

\* cited by examiner

COLOUR OPTIMISATION FOR DIRECT VIEW

CROSS-REFERENCE TO RELATED APPLICATIONS

This application claims priority under 35 U.S.C. § 119 to UK Patent Application GB 2117867.8, titled "Colour optimisation for direct view," filed on Dec. 10, 2021, and currently pending. The entire contents of GB 2117867.8 are incorporated by reference herein for all purposes.

FIELD

The present disclosure relates to a display device. More specifically, the present disclosure relates to a holographic projector, a method of holographic projection and holographic projection system. Some embodiments relate to a head-up display. Some embodiments relate to the generation and display of holograms of colour images for forming a full-colour holographic reconstruction that is eye-safe for a viewer, in particular, although not exclusively, when implemented using one or more laser light sources.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A holographic projector may form a full-colour holographic reconstruction. This may be achieved by displaying three single-colour holograms, and illuminating each hologram using a corresponding single-colour light source to form three single-colour holographic reconstructions at substantially the same time. An approach known as spatially-separated colours, "SSC", involves simultaneously forming the three single-colour holographic reconstructions, whilst another approach, known as frame sequential colour, "FSC", involves rapidly forming three single-colour holographic reconstructions in succession, so as to be within the integration time of the human eye. Thus, using either approach, a human viewer perceives a full-colour (i.e. polychromatic) image.

SUMMARY

Aspects of the present disclosure are defined in the appended claims.

There is disclosed herein a method of displaying a colour image. The method comprises a step of receiving an image for projection. The image is a colour image. The colour image comprises a first colour component and a second colour component. Each colour component may comprise an array of pixel values. Each pixel value may be an intensity value or so-called grey level. The method further comprises a step of calculating a first hologram of the first colour component and calculating a second hologram of the second colour component. The first hologram is configured to form a first holographic reconstruction of the first colour component when illuminated with light of a first colour. The second hologram is configured to form a second holographic reconstruction of the second colour component when illuminated with light of a second colour. The method further comprises a step of adding content (e.g. image/pixel content) of the second colour component to the first colour component prior to calculating the first hologram. It may be said that at least a portion of the content from the second colour component is added to the first colour component. The first hologram therefore comprises information of the first colour component and information of at least a portion of the second colour component. The method further comprises a step of forming the first holographic reconstruction and second holographic reconstruction at substantially the same time. The first holographic reconstruction therefore changes the chromaticity of the at least a portion of the second colour component. In embodiments, changing the chromaticity means changing the chromaticity coordinates of the colour of light in chromaticity space.

In embodiments, the method further comprises reducing content of the second colour component based on the content of the second colour component added to the first colour component, prior to calculating the second hologram. It may be said that content from the at least a portion of the second colour component is reduced or removed in correspondence with the content of the second colour component added to the first colour component. In some examples, a portion of the content of the second colour component is moved to the first colour component.

The word "colour" is used herein to reflect a light wavelength, such as a wavelength in the visible part of the spectrum. In accordance with this disclosure, the wavelength of each single "colour" is a narrowband wavelength such as +/−15 nm or +/−5 nm (e.g. full wave half maximum).

The term "colour space" is well known in the art as a system for referencing colours of a colour image. It may be said that a colour space provides for the representation of colours using a colour model comprising a plurality of primary colours. In contrast with chromaticity space, as described below, it represents the amount—in terms of intensity, irradiance, luminance or the like—of each primary colour. For example, a three-dimensional colour model may have three primary colours, such as red, green and blue, and a colour space may use a red, green and blue colour model. Thus, a colour represented in the colour space has three colour components corresponding to the primary colours, red, green and blue. Accordingly, the values (or amounts) of the three colour components together identify a particular "colour" (e.g. secondary colour) within the colour space. The following description refers to a "3D colour space" based on the primary colours red, green and blue—an "RGB colour model". This is because an RGB colour space is conventionally used to represent colour images in image data to correspond to the detection of the colours red, green and blue by the human eye. It may be said that an RGB colour space defines a colour based on the relative amounts—typically relative intensities—of red, green and blue mixed together. However, the skilled person will appreciate that the described techniques are applicable to other types of colour spaces, including those based on four-dimensional colour models such as a cyan, magenta, yellow and black (CMYK) colour model.

The term "colour component" of a colour image refers to the amounts—typically intensity values—of a respective colour used to represent the colours of the image within an image area. For example, in RGB image data, there are three colour components of a colour image, namely a red component, a green component and a blue component. Each colour component of a colour image typically comprises an array of values for the respective colour, wherein each value represents the amount—typically intensity—of the respective colour of light used to represent the particular colour at a respective spatial position within the image area. Thus, for example, each position within the array of values for the colour components may correspond to the position of an image pixel within the image.

The word "content" of a colour image refers to the information that represents the image. In embodiments, the content (or "colour content") of a colour image refers to the values of the colour components of a colour image. Thus, the content of a particular colour component of a colour image refers to the information (e.g. quantitative amounts such as values of intensity/luminance) for the respective colour of the colour component. For example, in RGB image data, the content of a particular colour component comprises the information represented by the array of data values—typically intensity values—for the respective colour used to represent the particular colour at respective spatial positions within the image area (e.g. an array of image pixels values).

References herein to "a portion of content" of a colour component of a colour image refers to an amount or quantity of the colour that represents a fraction of the total amount of the colour within the whole or a part of the image area of the colour component. In the described embodiments, the amount or quantity of the colour is an optical power, intensity or irradiance measurement or value of the colour within the colour image or colour component thereof. As the skilled person will appreciate, other types of measurements and values for quantifying an amount of a colour within a colour image are possible and contemplated.

References to "add/adding content" refers to increasing the information of a colour image and references to "remove/removing content" (or "reduce/reducing content") refers to decreasing the information of a colour image. For example, adding content to a second colour component of a colour image may comprise increasing a value (e.g. intensity or pixel/grey level value) of the second colour component. Similarly, removing/reducing content of a first colour component of a colour image may comprise reducing a value (e.g. intensity or pixel/grey level value) of the first colour component. In examples, the content or information corresponds to an amount or quantity of a colour within a colour image or a colour component thereof, such as an optical power, intensity or irradiance measurement.

The present disclosure refers to adding content of a second colour component of a colour image to a first colour component of the colour image. This typically comprises increasing a value of the first colour component of the colour image (e.g. an intensity value at a particular spatial position within the image) based on/in accordance with the corresponding value of the second colour component of the colour image (e.g. intensity value at the same spatial position within the image). The present disclosure further refers to removing content from the second colour component based on/in correspondence with the content of the second colour component added to the first colour component. This typically comprises reducing a value of the second colour component of the colour image (e.g. intensity value at a particular spatial position within the image) based on/in correspondence with the value added to the second colour component of the colour image (e.g. at the same spatial position within the image).

The term "chromaticity space" is well known to the person skilled in the art of colour science or display technology, and may be regarded as a system for representing the chromaticity of colours. In particular, a chromaticity space enables the representation of (the quality of) colours independent of luminance. Typically, the chromaticity of a colour in a chromaticity space consists of two independent parameters, namely hue (h) and saturation (s). Thus, a chromaticity space is a 2D colour space, and the standard chromaticity space is the so-called CIE 1931 xy chromaticity space. Thus, the chromaticity of a particular colour is the chromaticity value in a chromaticity space that represents the colour (e.g., in terms of hue (h) and saturation (s)), independent of (or with normalized) intensity/luminance.

Reference herein to "chromaticity" refers to an objective measure of colour in chromaticity space. Chromaticity may comprise a point or set of coordinates in chromaticity space. The coordinates may be polar coordinates such as hue and saturation. The coordinates may also be linear coordinates in xy-chromaticity space. In accordance with this disclosure, colour images defined in RGB colour space are processed. In some embodiments, the colour images are converted between a colour space and chromaticity space. The person skilled in the art will be familiar with the various approaches to converting chromaticity into RGB colour space, and vice versa. Whilst some embodiments describe two single colour components, e.g. green and blue, the reader will appreciate that these embodiments extend to three single colour components, namely, RGB. Likewise, whilst full colour image formation generally requires all three colour components in RGB colour space, statements herein refer to only two single colour components because the third single colour component is not essential in order to embody the concepts that are disclosed herein.

Each colour component is effectively a single-colour image component of the colour image. For example, the colour image may comprise a red image component, green image component and blue image component in a manner that will be familiar to the reader skilled in the art of colour image formation.

In examples, the image received for projection comprises a plurality of image pixels. Thus, the image includes a first colour value and second colour value for each pixel of the image, wherein a first pixel value corresponds to the first colour component and a second pixel value corresponds to the second colour component. In embodiments, each pixel of an RGB colour image effectively comprises a red pixel value, a green pixel value and a blue pixel value. For example, each pixel of the colour image may be displayed on a pixel of a conventional display device comprising red, green and blue subpixels in accordance with the respective red, green and blue pixel values. In some embodiments, the first colour component is the green colour component of a polychromatic image and the second colour component is the blue colour component of the polychromatic image. In some embodiments, image content of the blue colour (image) component is added to the green colour (image) component prior to calculation of the hologram for green light in order to adjust the chromaticity of the blue colour component towards green—at least in relation to the image content selected.

In accordance with the method of the present disclosure, the chromaticity of the at least a portion of image content of the second colour component (e.g. blue) may be at least partially shifted towards the first colour component (e.g. green). Thus, for example, the chromaticity of the at least a portion of image content may be "shifted" or "tuned" from mid blue to aquamarine. For example, the green values of one or more image pixels may be increased and the blue values of the one or more image pixels may be correspondingly reduced. Accordingly, the colour values of the corresponding image content (e.g. one or more image pixels) of the received colour image are adjusted or shifted in the RGB colour space. In consequence, image information of the green colour component (e.g. one or more green pixel values) is changed by adding content (increasing the amount of green—typically increasing green intensity values) and image information of the blue colour component (e.g. one or more blue pixel values) is changed by removing/reducing content (decreasing the amount of blue—typically reducing blue intensity values).

There is disclosed herein a projection system. The projection system is arranged to receive an image for projection. The image is a colour image. The colour image comprises a first colour component and a second colour component. The system is arranged to calculate a first hologram of the first colour component and a second hologram of the second colour component. The system is further arranged to add content of the second colour component to the first colour component before calculating the first hologram. The first hologram contains information of the first colour component and information of at least a portion of the second colour component. The system is further arranged to form a first holographic reconstruction by illuminating the first hologram with first colour light. The system is arranged to form a second holographic reconstruction by illuminating the second hologram with second colour light. The first holographic reconstruction and second holographic reconstruction are formed at substantially the same time. The first holographic reconstruction changes the chromaticity of the at least a portion of the second colour component.

The method and system of the present disclosure carries significant advantages—particularly in a laser-based projection system. For blue colour content comprising light provided by a blue laser, addition of a small amount of green colour content comprising light provided by a green laser can adjust or shift chromaticity only slightly (e.g. towards aquamarine), but substantially reduce the power of the blue laser required to achieve the required intensity/luminance. For shorter wavelength blue light (e.g. 430 nm or 451 nm), the reduction is more significant such that shorter wavelength blue lasers may be contemplated when they would normally be ruled out on eye safety grounds.

Embodiments of the present disclosure are based on a principle that, for any point in chromaticity (or colour) space, a region exists where colours are indistinguishable to the human eye. These regions are sometimes referred to as MacAdam ellipses in chromaticity space (or equivalent "discrimination ellipsoids" in colour space). Thus, the chromaticity of blue content of a colour image may be adjusted or shifted within a corresponding MacAdam ellipse. The new chromaticity value(s) may be selected from within the MacAdam ellipse based on one or more predefined rules. In some embodiments, upon request to display a specific "colour" (e.g. uniquely defined by a red, green and blue value), the method may comprise determining the point in the respective MacAdam ellipse for the "colour" based on one or more of the two objectives or rules for the colour image: (1) the lowest laser (optical) power relative to the maximum permissible exposure (MPE) threshold summed over each wavelength; and/or (2) minimum electrical power usage. Other rules for the selection of new chromaticity values are possible and contemplated, as described further below.

Image content of the second colour component may be added to the first colour component from the entire second colour component or a sub-area or sub-region of the second colour component such as one image element (i.e. pixel) of the second colour component. The image content may comprise a plurality or subset of pixels of the second colour component. The image content may be an image feature such as a shape, object, icon or e.g. indicia. For example, the image content may comprise a subset of pixels having same "colour" (e.g. a secondary colour uniquely defined by a red, green and blue value) to form a feature, such as a shape, object or icon, within the image area. In these embodiments, the single-colour component values of all pixels in this subset may be changed in accordance with the objectives or rules disclosed herein.

In embodiments, adding content refers to a process of changing image pixel values (e.g. intensity/irradiance values) of a first colour component of the colour image (e.g. green) based on/using the corresponding pixel values of a second colour component (e.g. blue) of the colour image. Changing image pixel values typically comprises increasing or decreasing pixel intensity values (sometimes referred to as grey level values). In some embodiments, portions of the image content represented by pixel values of the second colour component (i.e. fractions of the amount of colour represented by the pixel values) are added to the corresponding pixel values of the first colour component. In some embodiments, the addition of portions of image content of a second colour component to a first colour component enables the corresponding pixel values of the second colour component to be reduced. In addition, or alternatively, the intensity of light and/or power of the light source, used to illuminate the hologram of the second image component may be reduced. In other embodiments, the method enables the wavelength of the second colour (e.g. blue at 470 nm) to be changed to a wavelength that is usually considered undesirable for image formation (e.g. 430 nm) or a wavelength having a higher maximum permissible exposure threshold.

It may be said that the first hologram comprises information of the first colour component and information of at least a portion of the second colour component. Each hologram may be said to encode a corresponding (single colour) image. It may therefore be said that the first hologram encodes information of the first colour component and (at least a portion of) the second colour component. The first hologram forms the first colour component in its entirety and (at least a portion of) the second colour component during the same reconstructive process using first colour light. At substantially the same time (e.g. in a spatially separated colour (SSC) scheme or a frame sequential colour (FCS) scheme) the at least a portion of the second colour component is also formed from the second hologram using second colour light. The at least a portion of the second colour component formed of first colour light substantially overlaps with the at least a portion of the second colour component formed of second colour light. The first colour light and second colour light (e.g. light of first and second primary colour wavelengths) that combine, blend or mix to form a different colour (e.g. secondary colour). The ratio of the amount—typically intensity—of the first colour light and second colour light may determine colour. The different colour formed by mixing may correspond to a different point on the chromaticity spectrum than the second colour alone. In this way, it may be said that the mixing process changes, adjusts or shifts the chromaticity of the at least a portion of the second image component towards the first colour.

Further aspects, features and advantages of embodiments of the present disclosure will be apparent from the following detailed description and accompanying dependent claims.

There is further provided a projection system arranged to receive an image for projection. The image is a colour image comprising a first colour component and a second colour component. The system is arranged to calculate a first hologram of the first colour component and a second hologram of the second colour component. The system is further arranged to form a first holographic reconstruction by illuminating the first hologram with first colour light and form a second holographic reconstruction by illuminating the second hologram with second colour light. The first holographic reconstruction and second holographic reconstruction are formed at substantially the same time. The first hologram is illuminated with first colour light from a laser light source and the second hologram is illuminated with second colour light from an LED or reduced/short wavelength (e.g. less than 440 nm) light source so as to reduce the amount of the second colour in the composite colour holographic reconstruction comprising the first holographic reconstruction and the second holographic reconstruction. Optionally, the projection system is further arranged to add content of the second colour component to the first colour component before calculating the first hologram such that the first hologram contains information of the first colour component and information of at least a portion of the second colour component such that the first holographic reconstruction changes the chromaticity of the at least a portion of the second colour component. The first colour component may be green and the second colour component may be blue.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level"

may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
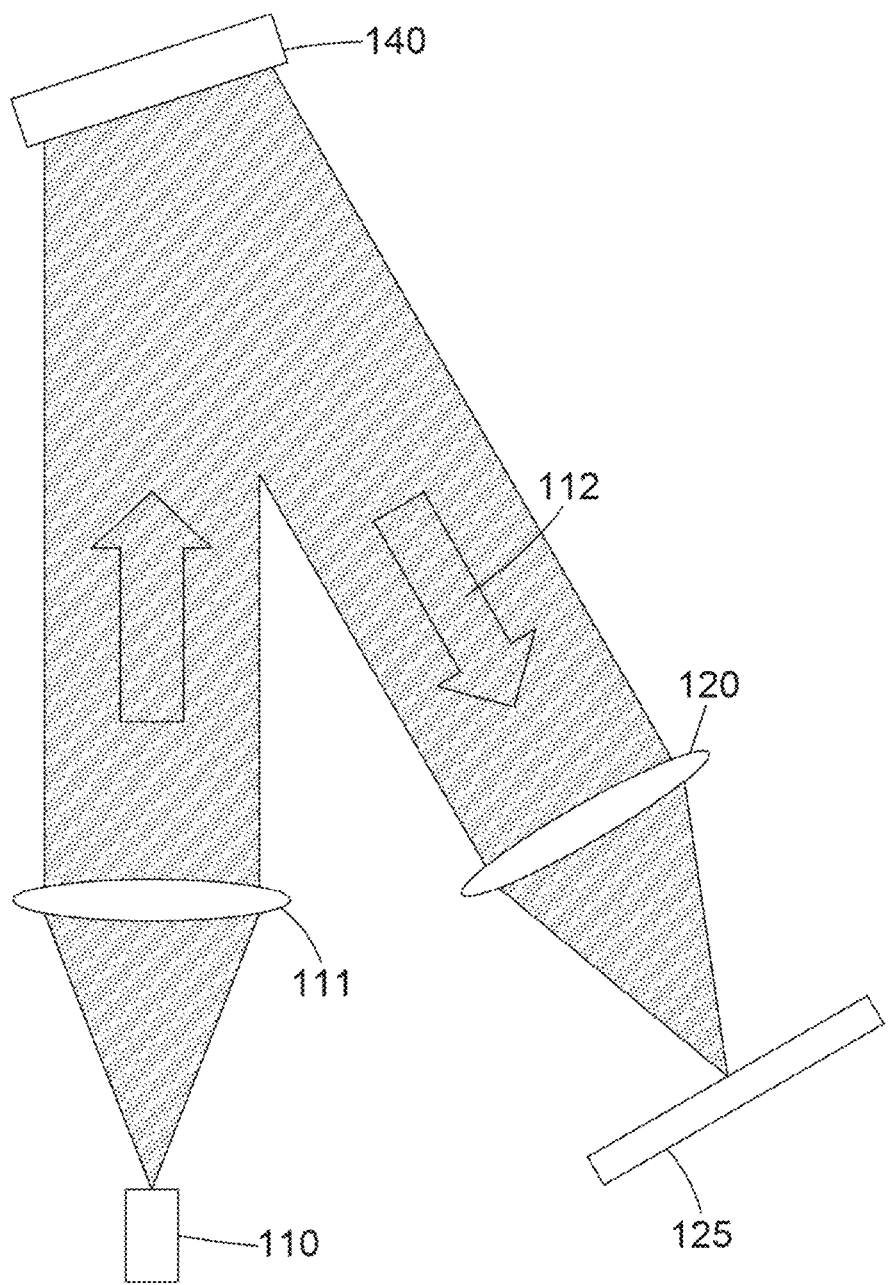
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
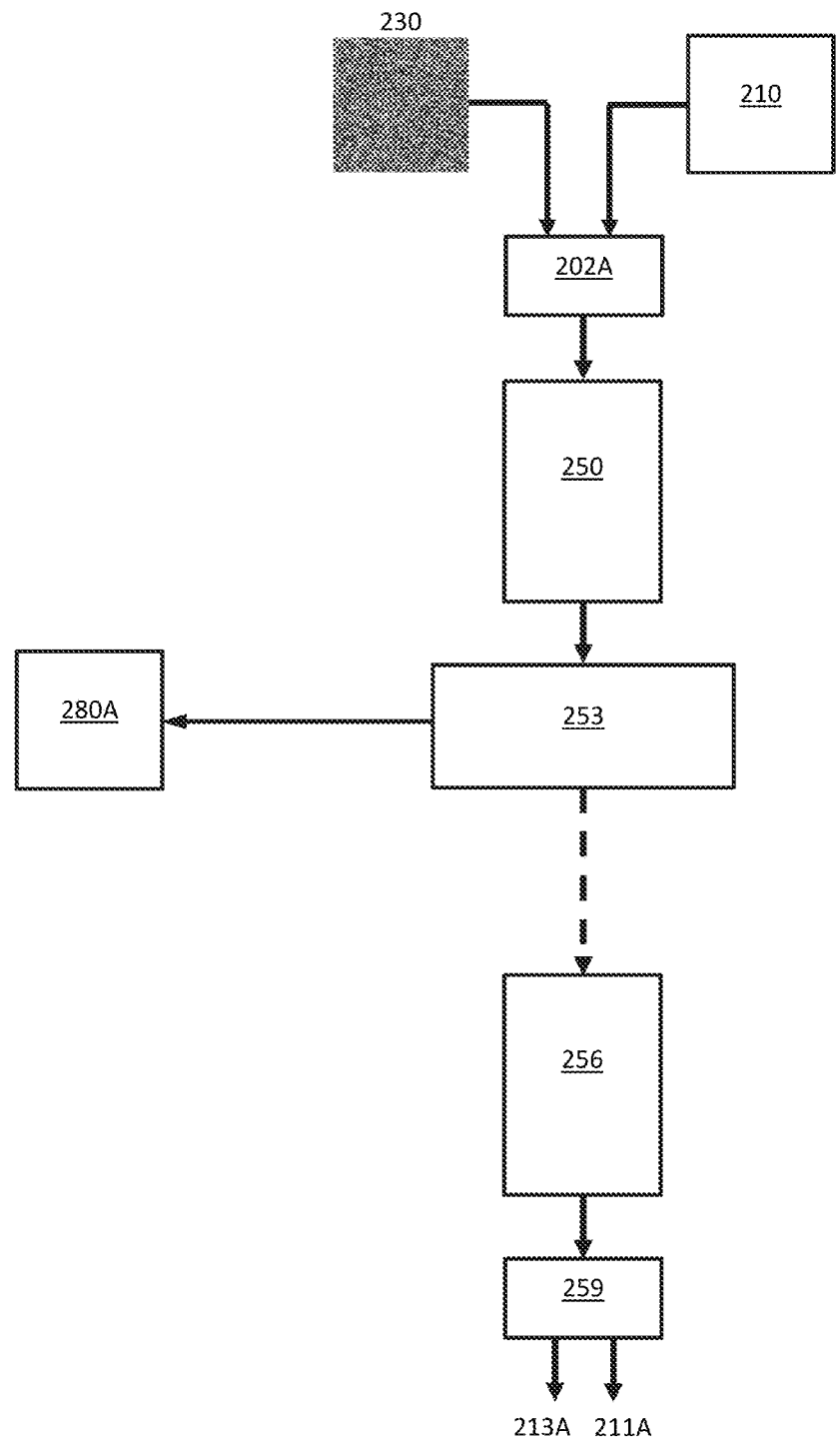
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
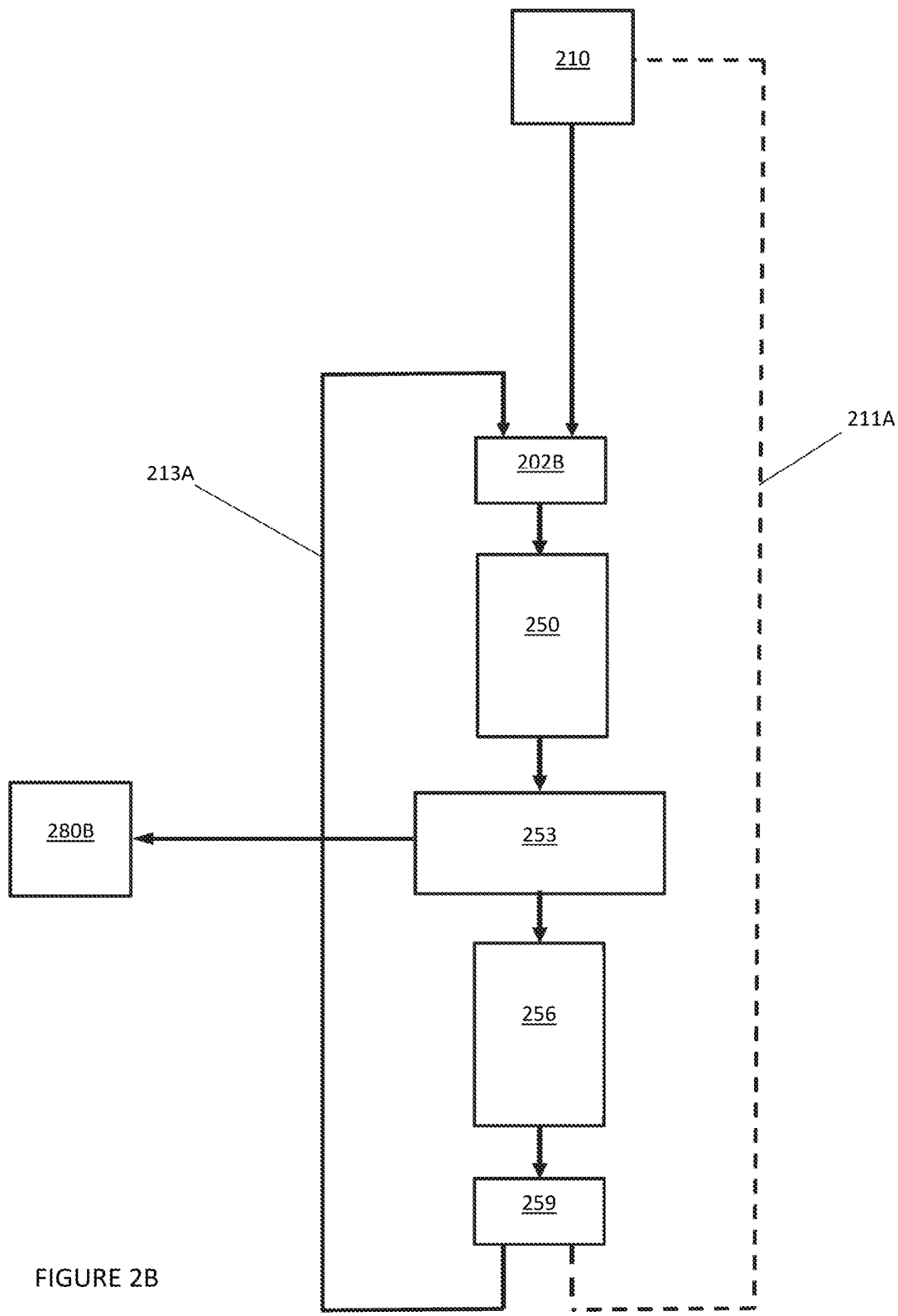
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
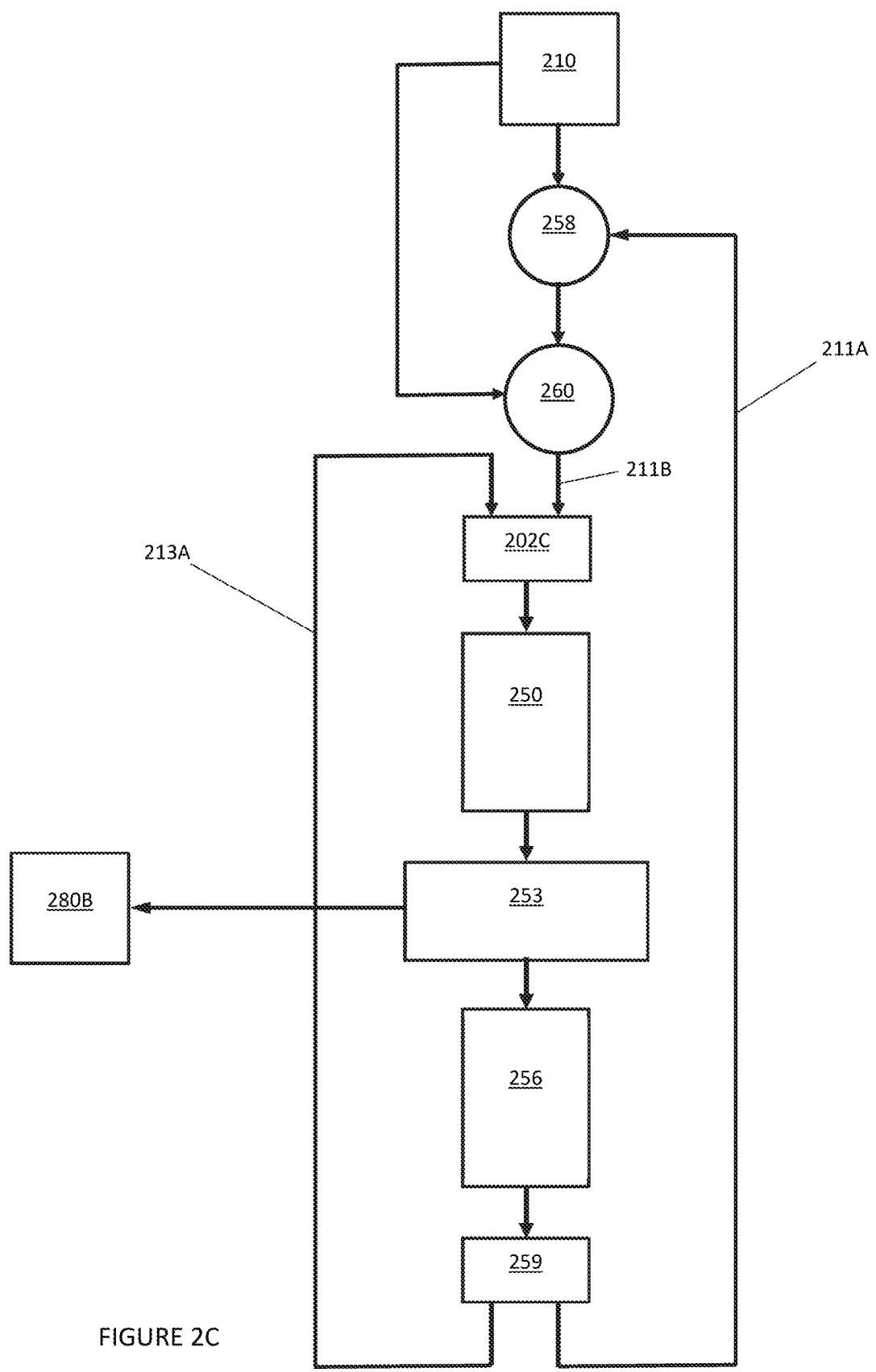
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
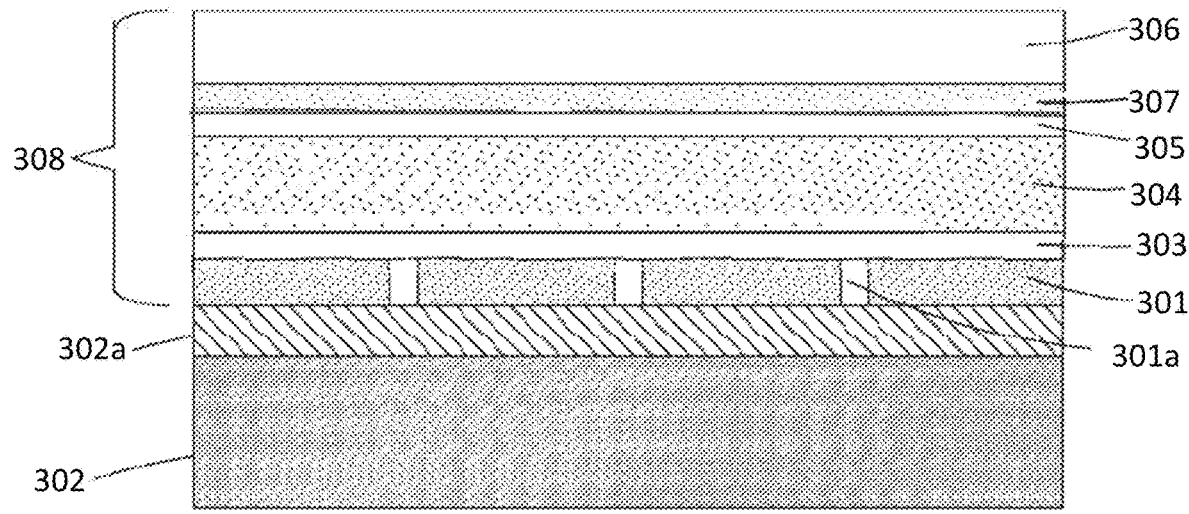
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Colour Holographic Projector

Figure 4:
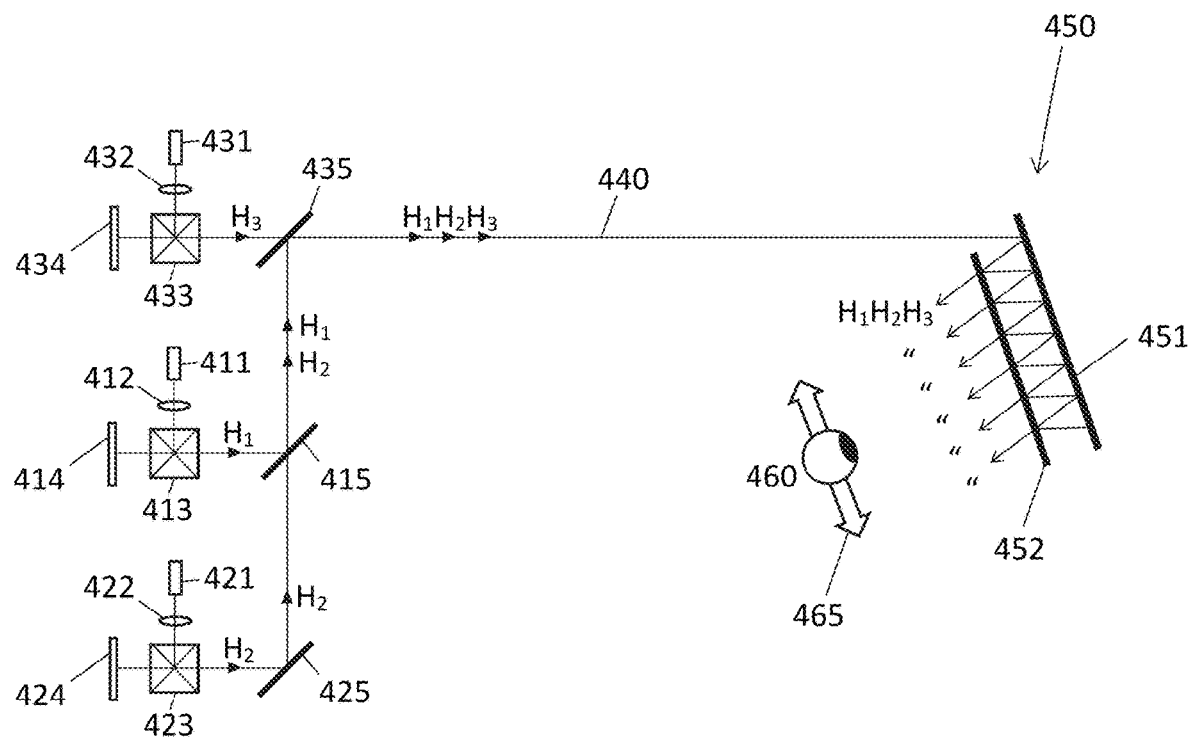
FIG. 4 shows an example of a "direct view" holographic projection system in accordance with embodiments.

FIG. 4 shows an example colour holographic projection system. The example system is arranged in a "direct view" configuration, meaning that the viewer directly views the display device. In these embodiments, the holographic reconstruction is formed on the retina of the viewer's eye.

The system comprises three colour channels, each colour channel corresponding to a wavelength of light for one of the primary colours of a colour model used to represent a colour image in a colour space. In the illustrated example, the primary colours are green, blue and red.

Referring to FIG. 4, a first colour channel comprises a first SLM 414 arranged to display a first hologram H1 and to be illuminated by light from a green light source 411 via a collimating lens 412 and a first beam splitter 413. First SLM 414 spatially modulates the collimated green light in accordance with the first hologram H1. Thus, first SLM 414 outputs spatially modulated light corresponding to the hologram H1. It may be said that the first SLM 414 outputs a signal comprising spatially modulated light H1 carrying (or encoded by or with) the first hologram, since the output wavefront is formed by, and corresponds to, the hologram H1. Thus, for simplicity, it may be said that the first SLM 414 outputs the first hologram H1. The first hologram H1 corresponds to the green colour component of an input/target colour image for projection. It may be said that the first hologram H1 is a green hologram. The first hologram H1 (i.e. the spatially modulated green light) is directed (by a third mirror 415 associated with a third colour channel) along common optical path 440 to a waveguide pupil expander 450.

A second colour channel comprises a second SLM 424 arranged to display a second hologram H2 and to be illuminated by light from a blue light source 421 via a collimating lens 422 and a second beam splitter 423. Second SLM 424 spatially modulates the collimated blue light in accordance with the second hologram H2. Thus, second SLM 424 outputs spatially modulated light corresponding to the second hologram H2. It may be said that the second SLM 424 outputs a signal comprising spatially modulated light carrying (or encoded by) the second hologram H2, since the output wavefront is formed by and corresponds to the second hologram H2. Thus, for simplicity, it may be said that second SLM 424 outputs the second hologram H2. The second hologram H2 corresponds to the blue colour component of the input/target colour image for projection. It may be said that the second hologram H2 is a blue hologram. The second hologram H2 (i.e. the spatially-modulated blue light) is directed (by a dichroic mirror 425 associated with the first colour channel and the third mirror 415) along the common optical path 404 to the waveguide pupil expander 450.

A third colour channel comprises a third SLM 434 arranged to display a third hologram H3 and to be illuminated by light from a red light source 431 via a collimating lens 432 a third beam splitter 433. Third SLM 434 spatially modulates the collimated red light in accordance with the third hologram H3. Thus, third SLM 434 outputs spatially modulated light corresponding to the third hologram H3. It may be said that the third SLM 434 outputs a signal comprising spatially modulated light carrying (or encoded by) the third hologram H3, since the output wavefront is formed by and corresponds to the third hologram H3. Thus, for simplicity, it may be said that third SLM 434 outputs the third hologram H3. The third hologram H3 corresponds to the red colour component of the input/target colour image for projection. It may be said that third hologram H3 is a red hologram. The third hologram H3 (i.e. the spatially-modulated red light) is directed along the common optical path 404 to the waveguide pupil expander 450.

In embodiments, the green light source 411 is a laser that outputs light having a green wavelength (e.g. 500-560 nm), the blue light source 421 is a laser that outputs light having a blue wavelength (e.g. 420-480 nm), and the red light source 431 is a laser that outputs light having a red wavelength (e.g. 620-680 nm).

The spatially modulated light of the first, second and third holograms H1, H2, H3 propagates along the common optical path 440 and is received into waveguide pupil expander 450 through an input port at a first end thereof. As is well known in the art, waveguide pupil expander 450 comprises a first, fully reflective surface 451 and a second, partially reflective/partially transmissive surface 452 arranged substantially parallel to the first surface 451. Accordingly, light of the first, second and third holograms that enters the waveguide pupil expander 450 propagates along the length of the waveguide towards a second ended thereof, by a series of internal reflections between the first and second surfaces 451, 452. At the same time, the second, partially reflective/partially transmissive surface 452 outputs light as a series of "replicas" along its length, each replica corresponding to the first, second and third holograms H1, H2, H3. A viewer 460 directly viewing the second surface 452 within an eye box 465 thus receives light of the first, second and third holograms H1, H2, H3. A holographic reconstruction of each of the first/green, second/blue and third/red holograms H1, H2, H3 is formed on the retina of the viewer's eye. The first, second and third holograms H1, H2, H3 are respectively displayed by first SLM 414, second SLM 424 and third SLM 434, and illuminated by respective light sources, at substantially the same time (i.e. within the integration time of the human eye) such that first/green, second/blue and third/red holographic reconstructions are formed at substantially the same time. Thus, the viewer perceives a composite full-colour or polychromatic holographic reconstruction comprising the first/green, second/blue and third/red holographic reconstructions, which correspond to the green, blue and red colour components of the input/target image.

Accordingly, in the arrangement shown in FIG. 4, the viewer 460 directly views the green, blue and red spatially modulated light respectively encoded with the first/green, second/blue and third/red holograms H1, H2, H3 via waveguide pupil expander 450. In embodiments in which the laser light sources provided the green, blue and red light, laser light may be incident on the eyes of the viewer 460.

Minimising and Reducing Laser Exposure for Eye-Safety

Display devices comprising laser light sources are required to meet predefined limits for eye safety. For example, the International Commission on Non-Ionising Radiation Protection (ICNIRP) defines levels of Maximum Permissible Exposure (MPE) for the eye under conditions of direct exposure to a single laser light beam. The laser eye safety limits are dependent upon the power of the laser, the wavelength of laser light and the duration of exposure. The laser safety limit for blue light is much lower than for red or green. For example, the power limit is approximately 40 µW blue light incident on the pupil whilst the power limit is greater than 300 µW red and green light incident on the pupil. In another example, the irradiance limit is approximately 1.05 $Wm^{-2}$ for blue light and approximately 10 $Wm^{-2}$ for red and green light. Furthermore, eye safety limits for exposure to laser light of several wavelengths assume an additive effect on a proportional basis, as described further below. Further information about laser eye safety can be found in the Technical Report of the International Electrotechnical Commission—IEC TR 60825-14: 2004(E)—which is incorporated herein by reference.

It is challenging for a display device, such as a spatial light modulator, to display a colour image having a large number of "pure blue" (or near "pure blue") pixels at high intensity/luminance and remain within the laser safe condition for all of the laser light wavelengths to which the eye is exposed, especially when implemented in direct view display devices.

The present disclosure proposes a technique for minimising laser exposure of a viewer's eyes when displaying a colour image. In embodiments, the technique ensures that, when displaying a colour image, the laser power or irradiance of light incident on viewer's eye pupil is below the combined/mixed colour Maximum Permissible Exposure (MPE) threshold for all wavelengths of light used to form the colour image, which assumes an "additive effect" as discussed above.

In particular, for embodiments that form a composite colour image comprising blue, green and red colour components, the combined/mixed colour MPE threshold may defined using the following equation 1:

$$\frac{Pb}{MPEb} + \frac{Pg}{MPEg} + \frac{Pr}{MPEr} < 1$$

where:
Pb is the total power of the light of the blue colour component of the composite colour image incident on the eye pupil of the viewer;
Pg is the total power of the light of the green colour component of the composite colour image incident on the eye pupil of the viewer;
Pr is the total power of the light of the red colour component of the composite colour image incident on the eye pupil of the viewer, and
MPEb, MPEg and MPEr are the MPE thresholds for the blue, green and red wavelengths of light used to form the respective blue, green and red colour components.

Accordingly, if the condition or rule defined in equation 1 is met, display of the colour image meets the eye safety limit.

For a colour display device as described herein, the values Pb, Pg, Pr of a colour image, corresponding to the power of blue, green and red light respectively, may be determined by measurement. For example, the values Pb, Pg, Pr may be measured using an optical power meter having an appropriate pupil size configured to receive the blue, green and red light from the display device.

In the following description, the value on the left-hand side of equation 1, namely:

$$\frac{Pb}{MPEb} + \frac{Pg}{MPEg} + \frac{Pr}{MPEr},$$

corresponds to the sum of the optical powers of the colour components of a colour image relative to the MPE threshold for each colour/wavelength. This value represents an objective measurement of the laser exposure when directly viewing the colour image displayed by a direct view display device.

Tuning Colour Image for Eye Safety

The present disclosure proposes processing a received colour image in order to satisfy eye-safety requirements, such as the combined/mixed colour MPE threshold defined in equation 1 above. In particular, a received colour image is analysed to determine whether display of the colour image will meet eye-safety requirements. If it is determined that the eye-safety requirements are not met, the received colour image is processed using the proposed image processing method.

In embodiments, the image processing method comprises "tuning" or even "optimising" the colour content of a colour image away from shorter wavelengths with higher eye safety risk (e.g. away from pure blue) so as to reduce laser exposure thereto, without changing the perception of the colour content to the human eye. Accordingly, the principle of the present disclosure is to move or shift a portion of content (colour information) of a second colour component (e.g. blue) of a colour image to the content (colour information) of a first colour component (e.g. green) of the colour image, without changing the composite content of the colour image as perceived by a viewer. Thus, content of the (shorter wavelength/higher risk/energy) second colour component is added to, and displayed as, content of the (higher wavelength/lower risk/energy) first colour component.

In embodiments, image content within the colour image at a first point (e.g. x, y coordinate) in a chromaticity/colour space corresponding to a particular colour, called "blue", may be tuned to a second point in the chromaticity/colour space at which the tuned colour is indistinguishable from "blue" to the human eye. For example, the second point in a chromaticity space is within the boundary of the same MacAdam ellipse as the first point in the chromaticity space. Similarly, the second point in a colour space is within the boundary surface of the same discrimination ellipsoid that comprises indistinguishable colours as the first point in the colour space. Thus, the perception of the colour content after "tuning" remains the same to the human viewer. The second point in chromaticity/colour space is selected from within the MacAdam ellipse/discrimination ellipsoid to meet a predefined rule for the colour image, for example based on an eye-safety condition (e.g. power or irradiance limit). Generally, the predefined rule is defined to reduce the amount of image content for "blue", in order to reduce the contribution of shorter wavelength/higher power light, so that the combined green, blue and red light of the colour image incident on the viewer's eye pupil meets eye-safety requirements. In some embodiments, the predefined rule is to reduce or minimise the amount of blue content (e.g. amount, such as intensity, of the blue colour component) of the colour image.

In an embodiment, the image content is tuned or adjusted to minimise the optical powers for the colour components of the image when summed over the MPE threshold for each colour/wavelength—i.e. to achieve the lowest result (below one) for that value on the left hand side of equation 1. In another embodiment, the image content is tuned to minimise the total electrical power consumed to display the image. This may correspond to minimising the total power consumed by red, green and blue light sources. In yet another embodiment, the image content is tuned to minimise the amount—such as intensity or irradiance—of blue content, for example, by choosing a point within the ellipse/ellipsoid that is furthest from "pure blue". Any suitable combination of such rules may be defined according to application requirements. Various alternative or additional rules, which form the basis for tuning colours or colour content of a colour image, are possible as discussed below.

The second colour component comprises a second colour of light with a relatively short wavelength/high photon energy. Thus, the second colour of the second colour component has a relatively high eye safety risk (e.g. risk associated with exposure of the eye to laser light of the second colour) compared to the eye safety risk of the first colour of the first colour component (at a corresponding laser power). That is, the power and/or irradiance safety limit of the second colour is lower than the power and/or irradiance safety limit of the first colour. According, the technique of the present disclosure enables the content (colour information) of the colour components of a colour image that does not meet eye safety requirements (e.g. does not comply with laser eye safe conditions) to be adjusted so as to meet eye safety requirements, when displayed by a display device. At the same time, in embodiments, the adjustment of the colour image does not change the appearance of the colour image to a viewer.

Example Method

Figure 5A:
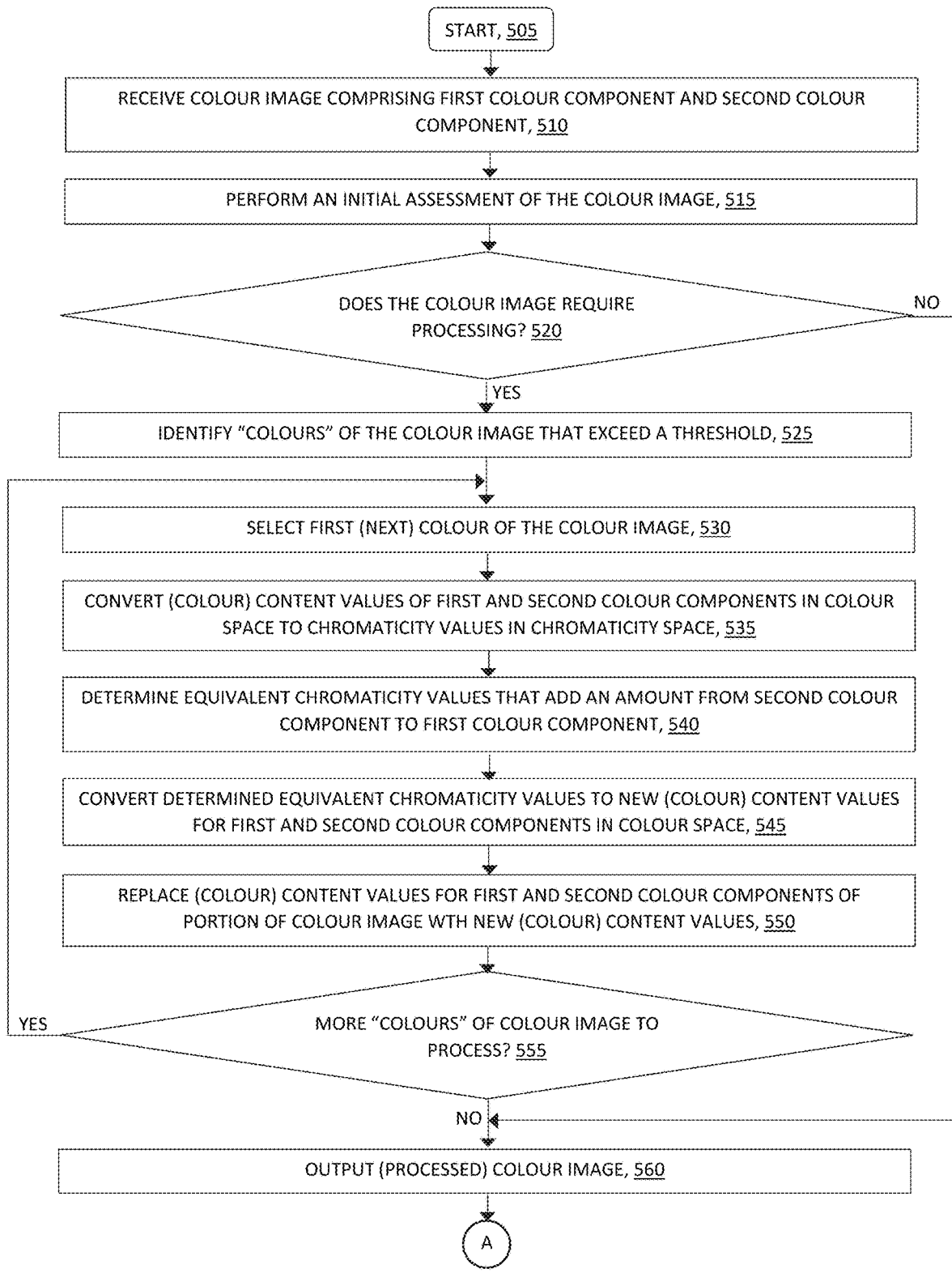
FIGS. 5A and 5B show a flow diagram of a method of processing and displaying a colour image in accordance with embodiments.
Figure 5B:
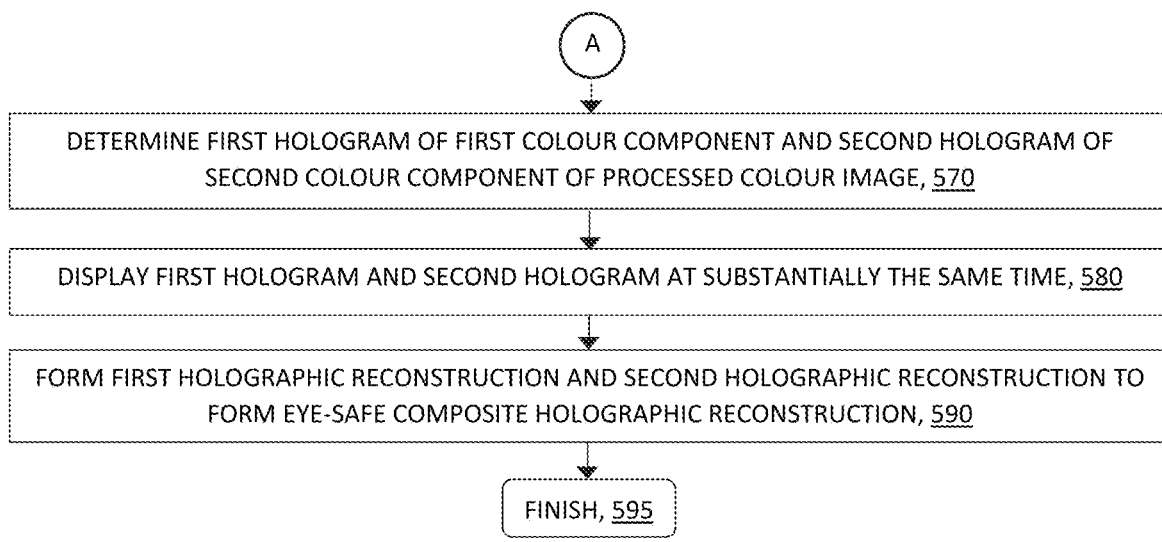

FIGS. 5A and 5B show a flow diagram of an example method of processing a colour image for display, in which the colour image is "tuned" for eye safety, as described above.

The method starts at step 505 in FIG. 5A. At step 510, a colour image is received. The colour image comprises a first colour component and a second colour component. For example, the first colour component may correspond to light of a first primary colour having medium energy wavelength such as green, and the second colour component may correspond to light of a second primary colour having a highest energy wavelength such as blue. In embodiments, the colour image may further comprise a third colour component, which, for example, may correspond to light of a third primary colour having a lowest energy wavelength such as red. As the skilled person will appreciate, the colour image may be received as image data representing a plurality of pixels of the colour image in accordance with a predefined colour space (e.g. an RGB colour space).

At step 515, the method determines whether processing of the received "colour" image is required, in accordance with this disclosure, prior to hologram calculation. For example, step 515 may analyse the colour content (i.e. the different composite/mixed/secondary colours) of the received colour image to determine (e.g. based on a system calibration) whether display of the colour image by the associated display device will (or likely will) satisfy an eye-safety condition, such as the combined/mixed colour MPE threshold defined in equation 1. Alternatively or additionally, step 515 may comprise identifying or assessing the number and/or magnitude of "pure blue" or near "pure blue" pixels—that is, pixels having a much higher blue pixel value than green and/or red. The person skilled in the art will understand that this assessment or analysis of the received "colour image" may use any a variety of different techniques. Nevertheless, step 515 is optional and the method may simply proceed to modifying the input image such as modifying the pixel values of individual components—e.g. areas, features or secondary/composite "colours"—of the received image.

At step 520, the method considers the result of step 515. If, on the one hand, the received image "passes" this initial assessment, then no further processing of the received colour image is required, and the method proceeds to step 560, which outputs the colour image for hologram generation as discussed below. If, on the other hand, the received image "fails" this initial assessment, then image processing of the received colour image is deemed necessary or required in order to "tune" or "optimise" one or more components/aspects—e.g. secondary colours—of the image in order to meet eye-safety requirements, and the method proceeds to step 525.

At step 525 of this embodiment, the method identifies the "colours" (i.e. composite or secondary colours) of the colour image that exceed a predefined threshold—e.g. are identified as containing significant amounts of pure blue or near pure blue. Reference in this embodiment to identifying particular "colours" of the colour image is by way of example only and other aspects or components of the colour image may be identified for processing by the method disclosed herein, as will be appreciated by the skilled person. Each "colour" (i.e. secondary/composite colour) of the colour image comprises a combination of the primary colour components such as red, green and blue colour components. However, as described above, the "colours" comprising a large amount of blue contribute the most to the total power. Accordingly, in one example, the predefined threshold may be a threshold value for the amount of blue (i.e. the primary colour of the second colour component) relative to red and green. For example, the method may identify the colours (e.g. combined blue, green and red pixel values) for which the relative intensity/grey level of the second (blue) colour component (e.g. blue pixel values) is above a threshold value. In other examples, the power contribution of the colour components of the colour image may be evaluated against a respective threshold for each primary colour. The colours identified in step 525 are then processed, in order to tune or adjust the colour, as described below, whilst colours of the image that are not identified remain unchanged (i.e. are not adjusted or tuned). As the skilled person will appreciate, in some embodiments, all of the colours of the colour image may be processed, in which case step 525 is omitted. In some embodiments, all pixels of the colour image are processed to form an optimised image for hologram calculation.

At step 530, a first colour of the colour image is selected for processing in subsequent steps 535 to 550. Again, this embodiment refers to different "colours" of the image by way of one example of processing different components or portions of the image. As described herein, the processing in steps 535 to 550 functions to add content of the second colour component (e.g. blue) to the first colour component (e.g. green) without changing the appearance of the colour to a viewer. Thus, it may be said that content is shifted from the second colour component corresponding to light of the primary colour having the highest energy/safety risk wavelength to the first colour component corresponding to light of the primary colour having a lower energy/safety risk wavelength. Thus, the colour image is processed so that it better meets the eye-safety condition. As the skilled person will appreciate, other techniques for processing the colours of the colour image to better meet the eye-safety condition are possible and contemplated.

At step 535, the (colour) content values—typically intensity values—of the first and second colour components for the selected colour in the predefined colour space are converted to chromaticity values in chromaticity space. For example, the (colour) content values of the selected colour of the colour image in an RGB colour space may be converted to corresponding chromaticity values in a chromaticity space. In embodiments, (colour) content values comprising red, green and blue pixel values for each pixel of the portion of the colour image may be converted to x, y chromaticity values in a (two-dimensional) chromaticity space. Techniques for conversion of content values between a colour space and a chromaticity space are well known to the skilled person, and so are not described herein.

At step 540, (new/replacement) chromaticity values that are equivalent to the (original) chromaticity values of the selected colour of the colour image are determined, which add content from the second colour component to the first colour component. For example, x, y chromaticity values for the colour of each pixel of the portion of the colour image may be used to determine equivalent x, y chromaticity values. The equivalent x, y chromaticity values correspond to an equivalent colour, meaning that the new/replacement x, y chromaticity values represent a colour that is indistinguishable by a human viewer to the colour represented by the original x, y chromaticity values of the colour image. Importantly, the equivalent x, y chromaticity values add an amount of the colour content from the second colour component to the first colour component, in order to reduce the power/energy of the reproduced colour and therefore reduce the viewer's exposure to laser light and/or to better comply with the laser eye-safety condition. The new/replacement x, y chromaticity values that are equivalent to the original x, y chromaticity values may be determined using a corresponding MacAdam ellipse, as described below with reference to FIGS. 6 and 7.

At step 545, the equivalent x, y chromaticity values are converted back to new (colour) content values of the original colour space. For example, the equivalent x, y chromaticity values for each pixel of the portion of the colour image may be converted to corresponding red, green and blue pixel values for the respective pixel in RGB colour space.

At step 550, the original (colour) content values of (at least) the first and second components of the portion of the colour image are replaced by the new/replacement (colour) content values determined in step 535. Thus, content from the second colour component (e.g. blue) is added to the content of the first colour component (e.g. green) for the selected colour of the colour image.

At step 555, the method determines whether there are more colours of the colour image identified in step 525 to consider. If there are more colours to consider, the method returns to step 530, which selects the next identified colour of the colour image for processing. The method then repeats steps 535 to 550 for the next and subsequent identified colour of the colour image. When step 555 determines that there are no further identified colours of the colour image to consider, the method proceeds to step 560. In some embodiments, every different composite/secondary colour of the image is processed as described in FIG. 5. In some embodiments, every pixel of the image is processed as described in FIG. 5. The skilled person will understand that, in practice, a look-up table may be implemented to change secondary colours to "equivalent" colours within the same MacAdam ellipse.

At step 560, the colour image comprising (at least) the first and second colour components is output as "A" for input to the next processing stage shown in FIG. 5B. In the case that the colour image has been processed in accordance with steps 525 to 555, of the colours the processed colour image corresponding to the identified colours of the (original) colour image thus include content from the second colour component of the (original) colour image added to the first colour component. As the skilled person will appreciate, the (colour) content values of all of the image pixels of the original, received colour image that correspond to a particular (secondary) colour (e.g. identified in step 525) are replaced with the new (colour) content values that have a reduced amount of the second colour component (e.g. reduced intensity/grey level values).

Further processing comprises (typically conventional) hologram generation and display by a display device, as described below with reference to FIG. 5B.

At step 570, a first hologram of the first colour component of the output colour image (e.g. green hologram) is determined and a second hologram of the second colour component of the output colour image is determined (e.g. blue hologram). In embodiments, a third hologram of a third colour component of the output colour image is also determined (e.g. red hologram). For example, each of the first, second and optional third holograms may be calculated from the corresponding colour component of the image using any suitable hologram calculation algorithm.

At step 580, the first hologram and the second hologram are displayed at substantially the same time. In embodiments, a third hologram is also displayed at substantially the same time as the first and second holograms.

At step 590 a first holographic reconstruction of the (displayed) first hologram and a second holographic reconstruction of the (displayed) second hologram is formed. In embodiments, a third holographic reconstruction of a (displayed) third hologram is also formed. For example, first, second and third holograms may be displayed by a display device, such as spatial light modulator, at the same time or in quick succession in a time period less than the integration time of the human eye. In addition, the displayed first, second and third holograms may be illuminated with light of the corresponding wavelength, so as to form spatially modulated light of the respective first, second and third holograms. The spatially modulated light carrying the first, second and third holograms may propagate along an optical path to a viewer, where a holographic reconstruction of the each of the respective first, second and third holograms is formed on the retina of the viewer's eye. Since the holograms are displayed, and so the holographic reconstructions are formed, at substantially the same time (i.e. in a time period less than the integration time of the human eye) the viewer perceives a composite polychromatic holographic reconstruction comprising the first/green, second/blue and third/red colour components. Although the chromaticity of the processed colour image is different from the chromaticity of the original colour image, the viewer's perception of the composite colour holographic reconstruction is the same as the original colour image. Advantageously, the power of the second colour component, and thus the overall power of the composite holographic reconstruction, is reduced in order to better meet eye-safety limits. The method finishes at step 595.

As the skilled person will appreciate, the illustrated method implements just one technique for adding content from the second colour component (e.g. blue) to the first colour component (e.g. green) of the colour image, in order to reduce the eye safety risk. In other examples, conversion of content values between a colour space and chromaticity space may not be necessary. Instead, so-called "discrimination ellipsoids" in the colour space may be used instead of MacAdam ellipses, wherein the colour values or coordinates in the colour space within a discrimination ellipsoid represent equivalent or indistinguishable colours.

Figure 6:
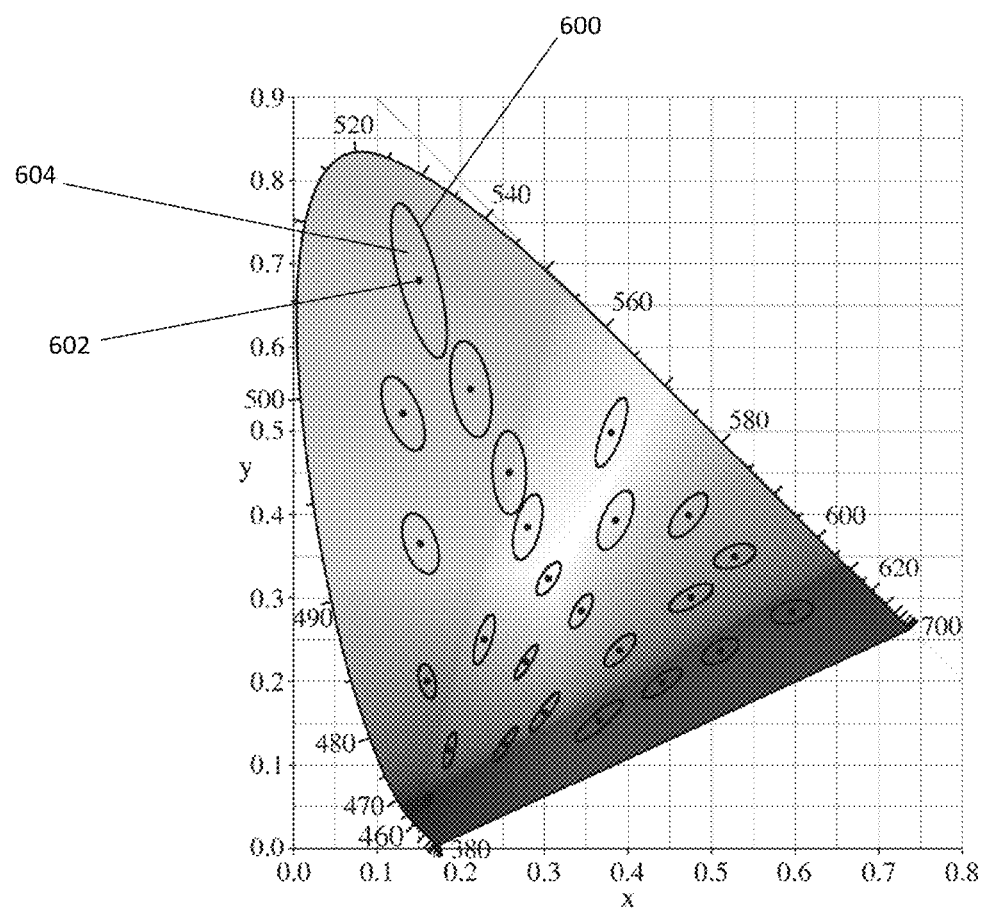
FIG. 6 is a chromaticity diagram showing example MacAdam ellipses within a chromaticity space.

FIG. 6 is a chromaticity diagram showing example MacAdam ellipses plotted within a two-dimensional chromaticity space. In particular, FIG. 6 depicts the standard CIE 1931 x, y chromaticity space, wherein the x, y chromaticity values/coordinates at each point within the depicted "horseshoe" area represents a unique colour. As the skilled person will appreciate, a gamut of a display device within a particular colour space comprises a subset of the colours shown in the CIE 1931 chromaticity diagram, which are typically defined within a triangular region of the horseshoe shape. FIG. 6 shows a plurality of McAdam ellipses 600 plotted on the chromaticity diagram. Each ellipse 600 has a centre point 602 in the CIE x, y chromaticity space and defines a region 604 within the boundary of the ellipse 600. As well known to the skilled person, the colours represented in chromaticity space by all points falling within the region defined by a MacAdam ellipse are indistinguishable from the colour represented by its centre point 602 to a human viewer. Thus, it may be said that the chromaticity values of the colours within (the boundary of) a MacAdam ellipse are "equivalent" in terms of their appearance to a human viewer.

Accordingly, in the method of FIG. 5A, step 540 may determine equivalent x, y chromaticity values, for an identified colour of the colour image that exceeds a threshold, using the MacAdam ellipse 600 having the original x, y chromaticity values (e.g. corresponding to "pure blue") at its centre point 602. For example, an identified colour comprising "pure blue" content (e.g. at least one image pixel) has x, y chromaticity values corresponding to "pure blue". As the skilled person will appreciate, references to "pure blue" refer to the primary colour "blue", which corresponds to the wavelength of light of the blue light source of a display device. In some embodiments, reference to pure blue means relatively low grey-level/pixel values for red and green. Thus, the identified colour of the colour image representing "pure blue" content only comprises information in the "blue" colour component of the colour image and does not include significant colour content in the "green" or "red" colour components. Step 540 may use the MacAdam ellipse containing the x, y chromaticity values of the colour "pure blue" to determine equivalent x, y chromaticity values for a colour that is more aquamarine (i.e. such that "pure blue" is shifted to "blue/green"), which has a reduced amount of shorter wavelength/high photon energy blue light. Alternatively, the equivalent x, y chromaticity values for each colour may be determined in advance (e.g. using MacAdam ellipses) and stored in a look-up table for subsequent retrieval in step 540. Still further, new/replacement (colour) content values for colours may be determined in advance and stored in a look-up table. In this case, the image processing performed in steps 525 to 555 on a colour-by-colour basis may be replaced by image processing on a pixel-by-pixel basis by retrieving the new/replacement pixel values corresponding to the original pixel values for each pixel of the colour image using the look-up table.

In the case of pixel-by-pixel processing, instead of colour-by-colour processing, more complex techniques for tuning colour components/content values of pixels of the colour image may be performed in order to satisfy one or more for rules (e.g. to meet eye-safety and/or other application requirements). For instance, pixels of a colour image may be processed in groups, and the (colour) content values of each pixel may be tuned dependent upon the (colour) content values of the surrounding pixels. In particular, surrounding pixels may alter the appearance of the "colour" of a pixel when perceived by the human eye.

Accordingly, (colour) content values may be tuned or adjusted for some pixels but not for other pixels (e.g. of the same "colour"). Likewise, (colour) content values may be tuned or adjusted for pixels having the same "colour" by different amounts. It is contemplated that predefined rules may be defined that control such tuning or adjustment of (colour) content values of pixels based on surrounding pixels (e.g. so that the appearance of the colour image to the viewer is "true" to the original image).

Example 1

Example 1, shown in Table 1 below, illustrates how the optical power, intensity or irradiance of a blue image component of a colour image may be reduced using the techniques described above. In the example, the colour image comprises a single (virtual) image pixel having a "pure blue" colour with a predefined luminance (measured in Cd/m²). In particular, the original image pixel is displayed using blue light from a blue light source, without any green light from a green light source or red light from a red light source.

Figure 7:
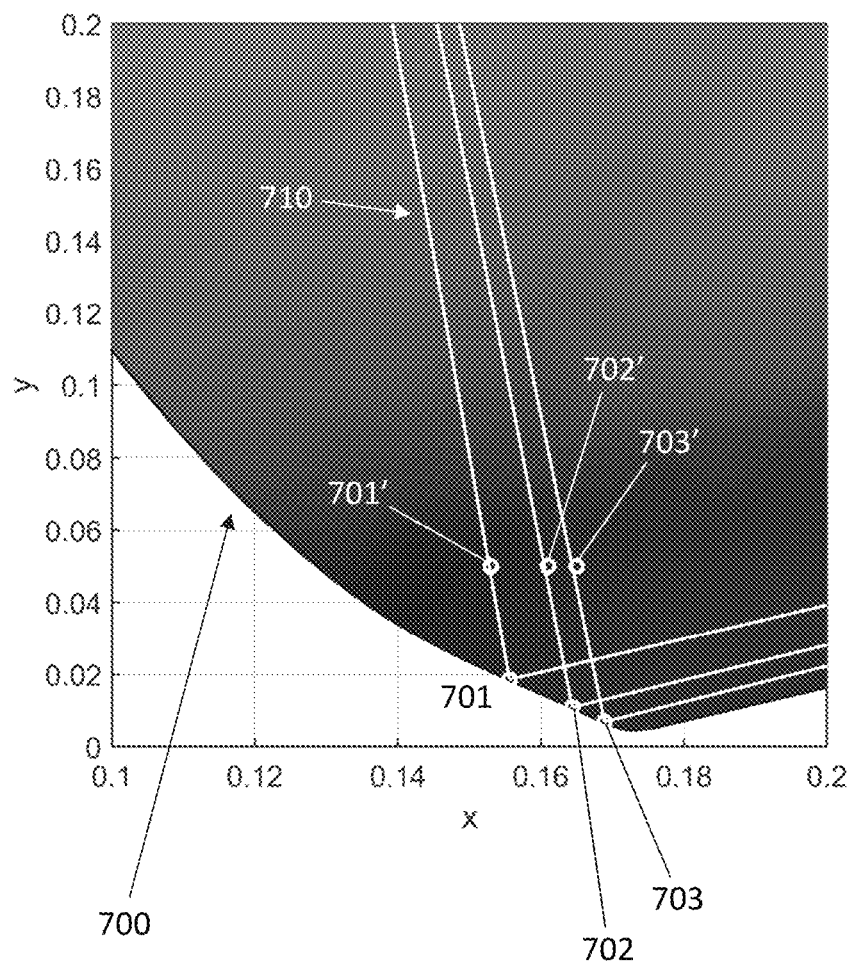
FIG. 7 is a part of the chromaticity diagram of FIG. 6 showing examples of adjusting chromaticity coordinate values for blue colour content of different example wavelengths in accordance with the embodiment of FIG. 5.

FIG. 7 illustrates how of the chromaticity of the blue colour of the pixel may be adjusted, "tuned" or "shifted" or "optimised" from original x, y chromaticity values to equivalent (new or replacement) x, y chromaticity values. Thus, the (colour) "shifted" image pixel comprises blue and (at least) green colours, which combine to have an equivalent appearance to the colour of the original pixel with the same intensity. Thus, the "shifted" image pixel is displayed using blue light from a blue light source, green light from a green light source and, optionally, red light from a red light source.

TABLE 1

| | Blue Wavelength used (nm) | | | | | |
|---|---|---|---|---|---|---|
| | 430 | | 440 | | 451 | |
| | Pure | Shifted | Pure | Shifted | Pure | Shifted |
| Red power | — | 0.07 | — | 0 | — | 0 |
| Green power | — | 13 | — | 9 | — | 12 |
| Blue power | 1000 | 135 | 500 | 105 | 300 | 105 |

The example compares three different wavelengths of the primary colour "blue" provided by the blue light source, namely 430 nm, 440 nm and 451 nm. In accordance with the above technique, the colour of the "pure blue" image pixel is shifted to a secondary "blue/green" or "aquamarine" colour represented by a different point within the corresponding MacAdam ellipse, based on a predefined rule (e.g. a rule based on compliance with an eye-safety condition or limit), which reduces the amount of blue (e.g. intensity, power or irradiance of blue light).

Referring to Table 1, for the blue wavelength of 430 nm, the original image pixel is formed using 1000 units of blue laser power, as shown in the left hand column for 430 nm in Table 1. The colour of the blue wavelength 430 nm is represented by the x, y chromaticity coordinates at point 703 in the chromaticity diagram of FIG. 7. For the blue wavelength of 440 nm, the original image pixel is formed using 500 units of blue laser power, as shown in the left hand column for 440 nm in Table 1. The colour of the blue wavelength 440 nm is represented by the x, y chromaticity coordinates at point 702 in the chromaticity diagram of FIG. 7. Finally, for the blue wavelength of 451 nm, the original image pixel is formed using 300 power units of blue laser power, as shown in the left hand column for 451 nm in Table 1. The colour of the blue wavelength 451 nm is represented by the x, y chromaticity coordinates at point 701 in the chromaticity diagram of FIG. 7. Since a "pure blue" colour is represented in each case, each of the points 701, 702 and 703 are positioned on the bottom left peripheral boundary of the chromaticity space 700 shown in the chromaticity space of FIG. 7.

In accordance with the described technique, the chromaticity of the "pure blue" colour of the image pixel corresponding to each of the points 701, 702 and 703 is changed or adjusted, so as to reduce the relative amount—in this case relative power and, in consequence, relative intensity—of blue, by shifting to respective different points 701', 702' and 703' within the respective MacAdam ellipse, as shown in FIG. 7. In particular, since the equivalent or replacement colour comprises a reduced amount of blue, and, in consequence, includes an amount of green (and optionally red), each of the new points 701', 702' and 703' are shifted away from the bottom left peripheral boundary of the chromaticity space 700 within the chromaticity diagram.

Referring again to Table 1, for the blue wavelength of 430 nm, the colour of the new (colour shifted) blue image pixel has a combination of blue, green and red colour components as represented by the x, y chromaticity coordinates at point 703' in the chromaticity diagram of FIG. 7. The blue laser power used to form the blue colour component is reduced from 1000 power units to 135 power units, the (added) green colour component is formed using 13 power units of green laser power and the (added) red colour component is formed using 0.07 power units of red laser power, as shown in the right hand column for 430 nm in Table 1. For the blue wavelength of 440 nm, the colour of the new blue image pixel has a combination of blue and green colour components as represented by the x, y chromaticity coordinates at point 702' in the chromaticity diagram of FIG. 7. The blue laser power used to form the blue colour component is reduced from 500 power units to 105 power units and the (added) green colour component is formed using 9 power units of green laser power, as shown in the right hand column for 440 nm in Table 1. For the blue wavelength of 451 nm, the colour of the new blue image pixel has a combination of blue and green as represented by the x, y chromaticity coordinates at point 701' in the chromaticity diagram of FIG. 7. The blue laser power used to form the blue colour component is reduced from 300 power units to 105 power units and the (added) green colour component is formed using 12 power units of green laser power, as shown in the right hand column for 440 nm in Table 1. As shown in the right hand column for 451 nm in Table 1.

In the example, the shifted points 701', 702' and 703' in chromaticity space are each chosen from the region within a MacAdam ellipse associated with the original points 701, 702, 703, respectively, based on one or more predefined rules, as described herein. Typically, the predefined rule relates to a property of the colour image as a whole, such as the optical power of the colour image or the electrical power consumed by a display device to form the colour image. Since the blue image pixel of the example is the whole colour image, the predefined rules may be one or more of: (i) minimise the laser power according to combined/mixed colour MPE threshold (see equation 1), and/or (ii) minimise electrical power usage for forming the image.

It will be appreciated that, in other examples, the shifted points in chromaticity space representing the "colours" of the colour image (e.g. multiple image pixels of different colours) may be chosen from within the MacAdam ellipse based on any predefined rule that moves a portion of content of the blue colour component to the green colour component, as described herein. Examples of other predefined rules are described below.

As noted above, for each colour, the shifted points—corresponding to the above described equivalent x, y chromaticity values—in chromaticity space may be determined in advance using one or more predefined rules, and stored in a look-up table for retrieval during processing of a received colour image.

Accordingly, the example shows that increasing the (relative) amount of green in the blue image pixel (corresponding to the colour image), by shifting the x, y chromaticity values representing the colour away from "pure blue", significantly reduces the (relative) intensity of the blue light, and thus the power of the blue light source (e.g. blue laser) required or consumed for image display. This, in turn, reduces the exposure of the viewer's eye to (high energy/eye-safety risk) blue light in a direct view display system, such as exposure to laser light in a direct view holographic projection system, as described herein. Furthermore, the example shows that it is possible to display a colour image within eye-safety limits using a variety of different wavelength blue light source, such as 430 nm, 440 nm and 451 nm. Thus, the techniques described herein for tuning a colour image enable provide increased design flexibility for the display system by enabling the selection of different light sources according to application requirements. Notably, the techniques open up the possibility of meeting eye-safety limits using shorter wavelength/higher power blue light sources, which would not have been possible for the display of (untuned) colour images (e.g. the display of "pure blue" would be too bright and so would not be eye-safe).

Rules for Tuning Colours of a Colour Image

A variety of possible predefined rules may be used to "tune", "adjust" or "optimise" the chromaticity of one or more colours of a received colour image to form a processed colour image that, when displayed, meets eye-safety requirements.

In particular, in embodiments, the processed colour image should satisfy the combined/mixed colour MPE threshold defined in equation 1, such that the total optical power of the light of the colour image incident on the viewer's eye pupil is eye-safe. Thus, this rule may correspond to the combined/mixed colour MPE threshold. Accordingly, a predefined rule may relate to a measurement of the (optical) power of the combined holographic reconstructions of the holograms corresponding to the processed colour image.

In other embodiments, a similar rule may be expressed in terms of the total electrical power (or current) used by the laser light sources for forming the processed colour image. Thus, a maximum electrical power threshold may be used as a predefined rule. Accordingly, a predefined rule may relate to a measurement of the electrical power (or current) used to form the holographic reconstructions of the holograms corresponding to the processed colour image.

Variations of the above rules for the whole colour image are possible. For example, another predefined rule may maximise the difference between the exposure level (e.g. optical power) of each colour (e.g. Pb) relative to its respective MPE threshold (e.g. MPEb). Another predefined rule may maximise the sum of these differences.

The above rules relate to measurements of power associated with the whole of the processed colour image that is seen by the viewer's eye positioned within an eye-box, so as to directly correlate with the power or irradiance limits defined in eye-safety standards. A predefined rule for the selection of equivalent x, y chromaticity values for each colour of the colour image may be used, where the predefined rule is based on one of the above thresholds for optical or electrical power for the whole colour image. For example, a predefined rule may be to minimise the amount of blue of a colour of the colour image. This corresponds to selecting equivalent x, y chromaticity values for the colours of the colour image from the respective MacAdam ellipse that increases/maximises the y value (i.e. to increase the amount of green) and, optionally, increases the x value (i.e. increases the amount of red). Thus, this predefined rule is based on the first of the above thresholds for the whole colour image, since it has the effect of reducing/minimising the (relative) power of the blue component, Pb, in the combined/mixed colour MPE threshold of equation 1.

Variations of the above rule include to minimise one or more of: the (relative) proportion of the blue colour component within the colour; the (relative) intensity or irradiance of the blue light used to form the colour, and the (relative) electrical power used by the blue light source to form the colour. In another example, a predefined rule may be to reduce (rather than minimise) the amount of blue of the colour. In yet another example, the rule may be to minimise the total power density of the colour.

In embodiments, predefined rules for the selection of equivalent chromaticity values for each colour of the colour image have the effect of shifting a portion of content of the blue colour component to the green colour component (and optionally the red colour component).

Modifications of Colour Tuning

In a modification of the above described "colour tuning" technique, it may be desirable to tune the same colour differently at different spatial positions within the image area. In particular, as well known in the art, different areas of the retina of the human eye have different sensitivities. Thus, the colours may be tuned differently depending on angular content. Thus, for example, a different look-up table of equivalent x, y chromaticity values (or colour content values in colour space) for colours may be provided for different angular content within a colour image.

For a colour image that includes the colour "white", colour tuning may be more complex due to the different definitions of the white point for standard illuminants. Accordingly, when processing the colour "white" of a colour image, colour content values (e.g. values of red, green and blue colour components) may be determined using a rule that provides the best eye-safety (e.g. minimises power) when displayed using the light sources of the display device but that still appears white under environmental conditions.

Other Techniques

Other techniques for minimising laser exposure of a viewer's eyes when displaying a colour image, which may be used alone or in addition to tuning the colour image as described above, are possible and contemplated.

For instance, the light source of a display device for a holographic projector may comprise another suitable source of substantially monochromatic blue light, such as an LED, in addition or as an alternative to a blue laser light source. Since the eye-safety conditions (e.g. power and irradiance limits) associated with LED blue light are much higher than for laser light, this technique can be used to minimise exposure to (high energy/high eye-safety risk) blue light and, in particular, stay within eye safe conditions in direct view display devices. As the skilled person will appreciate, the "colour tuning" of the blue colour component of a colour image, as described herein, may enable the effective use of LED blue light sources in certain applications.

In addition, or alternatively, an image processing technique may be used to change the colour perception of colours of portions (e.g. sub areas) of a colour image. The skilled person is familiar with the principle that adjacent colours within a colour image can influence the perception of each colour by a human viewer. For example, the use of red/(near) infrared wavelengths in one region may still stimulate a red response in the eye, which, when coupled with placement near a blue region of a colour image, may trick the eye into perceiving higher brightness or contrast of the blue colour. Thus, for a blue portion of the colour image, which does not meet eye-safety conditions due to a large amount of blue colour content (e.g. a portion having a large number of "pure blue" image pixels and/or a high intensity of blue), the colour(s) of one or more adjacent portions within the colour image may be modified to include more red (or additionally to include invisible near red) so as to make the blue portion appear more blue. Thus, it is possible to reduce the power of the blue light source and/or the intensity of the blue portions, whilst maintaining the chromaticity of the blue colour content of the colour image. As the skilled person will appreciate, this technique may be used when processing the identified portions of a colour image using steps 525 to 540 of the method of FIG. 5.

In another technique, which may be used alone or in combination with any of the techniques described herein, the display device may implement gating of the laser light source, and/or pulse width modulation (PWM) of laser light pulses. The timing of such gating and/or PWM may be chosen to achieve a desired brightness (e.g. for one or more colours or colour components of the colour image) whilst minimising electrical power.

Figure 8:
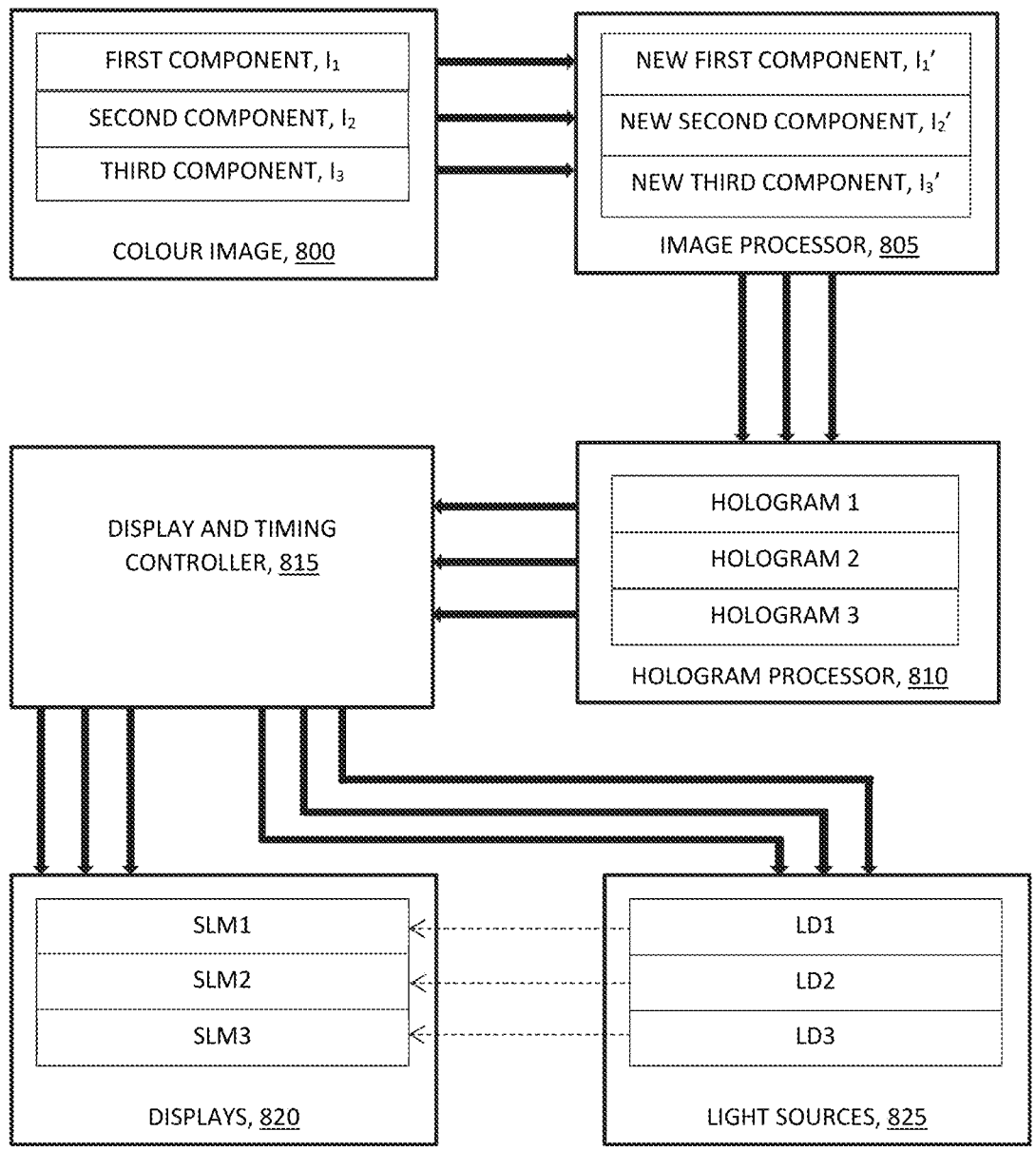
FIG. 8 is a schematic block diagram of a system in accordance with embodiments.

FIG. 8 is a schematic block diagram of a system in accordance with embodiments of the present disclosure.

The system comprises an image processor 805. Image processor 805 is arranged to receive a target colour image 800 for display comprising a first colour component 11, a second colour component 12 and a third colour component 13. Image processor 805 is arranged to process the colour image 800 in accordance with one or more of the techniques described herein, for example to add (a portion of) content from the second colour component to the first colour component. Thus, image processor 805 is arranged to determine a processed colour image comprising new first colour component $I_1'$, new second colour component $I_2'$ and new third colour component $I_3'$.

The system further comprises a hologram processor 810. Hologram processor 810 is arranged to receive the processed colour image from image processor 805 and to calculate a hologram for each of the new first, second and third colour components, for example using any suitable hologram calculation algorithm. Thus, hologram processor 810 is arranged to calculate a first hologram 1 using new first colour component $I_1'$, a second hologram 2 using new second colour component $I_2'$ and a third hologram 3 using new third colour component $I_3'$ of the processed colour image.

The system further comprises a display and timing controller 815. Display and timing controller 815 is arranged to receive first hologram 1, second hologram 2 and third hologram 3 from hologram processor 810. Display and timing controller 815 is further arranged to encode (or write) the received hologram 1, 2 and 3 on displays 820 in accordance with a predefined timing sequence. In the illustrated arrangement, displays 820 comprises a first spatial light modulator SLM1 arranged to display first hologram 1, a second spatial light modulator SLM2 arranged to display second hologram 2 and a third spatial light modulator SLM3 arranged to display third hologram 3, such that the three individual single colour holograms 1, 2 and 3 can be displayed concurrently. In other arrangements, displays 820 may comprises a single display device, such as the spatial light modulator, and the three individual single colour holograms are displayed sequentially in a time period within the integration time of the human eye. In addition, display and timing controller 815 is arranged to control light sources 825 in accordance with the predefined timing sequence, so as to illuminate each of holograms 1, 2 and 3 with light of the corresponding single colour during display thereof. In particular, light sources 825 comprise a first source LD1 arranged to illuminate first spatial light modulator SLM1 with first colour light of the first colour component, a second light source LD2 arranged to illuminate second spatial light modulator SLM2 with second colour light of the second colour component and a third light source LD3 arranged to illuminate third spatial light modulator SLM3 with third colour light of the third colour component.

Accordingly, when a viewer directly views the displays 820, for example via a waveguide pupil expander as described above with reference to FIG. 4, a composite colour holographic reconstruction is formed on the viewer's eye that is perceived to be the same as the target colour image 800. In particular, the composite holographic reconstruction is formed by the combination of a first holographic reconstruction of the first hologram, which is perceived as the first colour component of colour image 800, a second holographic reconstruction of the second hologram, which is perceived as the second colour component of colour image 800, and a third holographic reconstruction of the third hologram, which is perceived as the third colour component of colour image 800.

ADDITIONAL FEATURES

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

As described herein a composite colour holographic reconstruction comprising first, second and third single colour holographic reconstructions is formed. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A projection system configured to:
receive an image for projection, wherein the image is a color image comprising a first color component and a second color component;
calculate a first hologram of the first color component and a second hologram of the second color component;
add content of the second color component to the first color component before calculating the first hologram such that the first hologram contains information of the first color component and information of at least a portion of the second color component;
remove content from the second color component based on the content of the second color component added to the first color component, prior to calculating the second hologram; and
form a first holographic reconstruction by illuminating the first hologram with first color light and form a second holographic reconstruction by illuminating the second hologram with second color light, wherein the first holographic reconstruction and second holographic reconstruction are formed at substantially the same time such that the first holographic reconstruction changes a chromaticity of the at least a portion of the second color component so as to reduce an amount of light of the second color in the first and second holographic reconstructions.

2. The projection system of claim 1, wherein the projection system is further configured to:
add content of the second color component to the first color component by increasing one or more values of one or more pixels of the first color component based on one or more values of a corresponding one or more pixels of the second color component.

3. The projection system of claim 1, wherein the projection system is further configured to:
add content of the second color component to the first color component by replacing color content values corresponding to individual colors of the color image with new color content values for at least the first and second colors, wherein the new color content values are selected to reduce at least one of (i) an amount of the second color in the respective color or (ii) a relative intensity of the second color in the respective color.

4. The projection system of claim 3, wherein the new color content values are determined using the color content values of the received color image and a look-up table.

5. The projection system of claim 3, wherein at least one of: (i) the color content values comprise image pixel values of the color image, wherein each image pixel comprises a first pixel value for the first color and a second pixel value for the second color; or (ii) the color content values comprise image pixel values that together represent the color of the respective image pixel in a color space.

6. The projection system of claim 1, wherein the color image is defined in a color space comprising the first and second colors, wherein the system is further arranged to, for individual colors of one or more colors of the color image:
convert color values representing a color from the color space of the color image to first two-dimensional chromaticity values, xy, in a two-dimensional chromaticity space;
determine a MacAdam ellipse containing the corresponding first two-dimensional chromaticity value, xy;
identify a second two-dimensional chromaticity value, x'y', within the ellipse based on a predetermined rule;
convert the second two-dimensional chromaticity value, x'y', to new color values in the color space, and
calculate the first hologram of the first color component and the second hologram of the second color component using the new color values of the color image, wherein the second chromaticity values add content of the second color component to the first color component.

7. The projection system of claim 6, wherein at least one of (i) individual chromaticity values of the first and second chromaticity values comprises a respective pair of chromaticity coordinates in the two-dimensional chromaticity space, or (ii) the color space comprises a three-dimensional color space, such as an RGB color space.

8. The projection system of claim 6, wherein the predetermined rule is arranged so as to reduce a total power density of the color of the color image comprising at least the first and second colors.

9. The projection system of claim 6, wherein the predetermined rule is arranged so as to minimize an amount of electrical power or electrical current needed to drive light sources of the first and second colors that respectively illuminate the first and second holograms.

10. The projection system of claim 6, wherein the predetermined rule is that the colors of the color image satisfy a threshold:

$$\frac{Pb}{MPEb} + \frac{Pg}{MPEg} + \frac{Pr}{MPEr} < 1$$

where:
Pb is a total power of a blue color component of the color image;
Pg is a total power of a green color component of the color image;
Pr is a total power of a red color component of the color image, and
MPEb, MPEg and MPEr are Maximum Permissible Exposure (MPE) thresholds for blue, green and red wavelengths of light used to form respective blue, green and red color components.

11. The projection system of claim 1, wherein the projection system is arranged in a direct view configuration so as to form the first and second holographic reconstruction on a retina of a viewer, wherein adding content of the second color component to the first color reduces a light exposure of the viewer of the color image.

12. The projection system of claim 11, wherein the projection system further comprises at least one waveguide pupil expander configured to propagate light of each of the first and second holograms to an eye of the viewer.

13. The projection system of claim 1, wherein each hologram is a one of (i) a Fresnel hologram, (ii) a Fourier hologram, or (iii) a point cloud hologram.

14. The projection system of claim 1, wherein the projection system is configured to:
add content to the color image at spatial positions adjacent to regions of the second color component having second color content greater than a threshold intensity, so as to change a perception of the color in those regions by a viewer.

15. The projection system of claim 14, wherein the projection system is configured to:
add content to a third color component of the color image, or
add content of a non-visible wavelength to the color image, wherein the non-visible wavelength corresponds to an infrared wavelength or a near infrared wavelength.

16. The projection system of claim 1, wherein the projection system is configured to:
analyze the received color image to determine whether display of the color image will meet eye-safety requirements; and
add content of the second color component to the first color component before calculating the first hologram such that the first hologram contains information of the first color component and information of at least a portion of the second color component, if it is determined that the eye-safety requirements are not met.

17. A method of displaying a color image, the method comprising:
receiving an image for projection, wherein the image is a color image comprising a first color component and a second color component, and calculating a first hologram of the first color component and a second hologram of the second color component;

wherein the method further comprises:

adding content of the second color component to the first color component before calculating the first hologram such that the first hologram contains information of the first color component and information of at least a portion of the second color component;

reducing content of the second color component in correspondence with the content of the second color component added to the first color component; and forming a first holographic reconstruction by illuminating the first hologram with first color light and forming a second holographic reconstruction by illuminating the second hologram with second color light, wherein the first holographic reconstruction and second holographic reconstruction are formed at substantially the same time such that the first holographic reconstruction changes a chromaticity of the at least a portion of the second color component so as to reduce an amount of light of the second color in the first and second holographic reconstructions.

18. A tangible, non-transitory computer-readable medium comprising program instructions, wherein the program instructions, when executed by one or more processors, cause a system to perform a method of displaying a color image, the method comprising:

receiving an image for projection, wherein the image is a color image comprising a first color component and a second color component, and calculating a first hologram of the first color component and a second hologram of the second color component;

wherein the method further comprises:

adding content of the second color component to the first color component before calculating the first hologram such that the first hologram contains information of the first color component and information of at least a portion of the second color component;

reducing content of the second color component in correspondence with the content of the second color component added to the first color component; and forming a first holographic reconstruction by illuminating the first hologram with first color light and forming a second holographic reconstruction by illuminating the second hologram with second color light, wherein the first holographic reconstruction and second holographic reconstruction are formed at substantially the same time such that the first holographic reconstruction changes a chromaticity of the at least a portion of the second color component so as to reduce an amount of light of the second color in the first and second holographic reconstructions.

19. The projection system of claim 2, wherein the one or more values of pixels comprise one or more of intensity or grey level values.

20. A projection system configured to:

receive an image for projection, wherein the image is a color image comprising a first color component and a second color component;

calculate a first hologram of the first color component and a second hologram of the second color component, and form a first holographic reconstruction by illuminating the first hologram with first color light and form a second holographic reconstruction by illuminating the second hologram with second color light, wherein the first holographic reconstruction and second holographic reconstruction are formed at substantially the same time;

wherein the projection system is further configured to add content of the second color component to the first color component before calculating the first hologram such that the first hologram contains information of the first color component and information of at least a portion of the second color component such that the first holographic reconstruction changes a chromaticity of the at least a portion of the second color component and is further configured to reduce content of the second color component in correspondence with the content of the second color component added to the first color component; and wherein the first hologram is illuminated with first color light from a laser light source and the second hologram is illuminated with second color light from an LED or reduced/short wavelength (e.g. less than 440 nm) light source so as to reduce an amount of the second color in a composite color holographic reconstruction comprising the first holographic reconstruction and the second holographic reconstruction, optionally wherein the first color component is green and the second color component is blue.

* * * * *